(12) United States Patent
Choi (10) Patent No.: US 10,091,104 B1
(45) Date of Patent: Oct. 2, 2018

(54) OBJECT REORDERING FOR FAST LAYER 4 SWITCHING OF MULTIPLEXED CONNECTIONS

(71) Applicant: Akamai Technologies, Inc., Cambridge, MA (US)

(72) Inventor: Byung K. Choi, Boston, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 26 days.

(21) Appl. No.: 15/170,402

(22) Filed: Jun. 1, 2016

Related U.S. Application Data

(60) Provisional application No. 62/168,941, filed on Jun. 1, 2015.

(51) Int. Cl.
*H04L 1/00* (2006.01)
*H04L 12/741* (2013.01)
*H04L 12/26* (2006.01)
*H04L 29/06* (2006.01)
*H04L 29/08* (2006.01)

(52) U.S. Cl.
CPC .......... *H04L 45/74* (2013.01); *H04L 43/0829* (2013.01); *H04L 69/161* (2013.01); *H04L 69/326* (2013.01)

(58) Field of Classification Search
CPC ......... H04L 1/00; H04L 1/004; H04L 1/0061; H04L 1/0072; H04L 1/0078; H04L 1/1607; H04L 1/18; H04L 1/1803; H04L 7/048; H04L 41/06; H03M 13/00
See application file for complete search history.

(56) References Cited

U.S. PATENT DOCUMENTS

| | | | |
|---|---|---|---|
| 2012/0121014 A1* | 5/2012 | Rusert | H04N 21/4385 375/240.12 |
| 2014/0046882 A1* | 2/2014 | Wood | G06N 3/02 706/16 |
| 2014/0269917 A1* | 9/2014 | Van der Laan | H04N 19/105 375/240.16 |
| 2017/0187593 A1* | 6/2017 | Balasubramanian | H04L 43/0829 |

* cited by examiner

*Primary Examiner* — Mohamed A Kamara
(74) *Attorney, Agent, or Firm* — David H. Judson (57) ABSTRACT

Packet loss that arises due to an in-order serialization requirement for multiplexed stream delivery is ameliorated by a packet reordering scheme. In this approach, when out-of-sequence packets are detected, a switching entity (e.g., a Layer 4 switch) continues to relay the packets as long as the out-of-sequence packets are associated with different streams and are themselves in-sequence in their associated stream. To facilitate this process, the TCP protocol stack is augmented to recognize when a particular packet stream is to be processed in this manner.

18 Claims, 6 Drawing Sheets

OBJECT REORDERING FOR FAST LAYER 4 SWITCHING OF MULTIPLEXED CONNECTIONS

BACKGROUND

Technical Field

This application relates generally to data packet switching.

Brief Description of the Related Art

Transport layer switches splice two OSI Layer 4 (L4) connections. Given two connection legs, Layer 4 switches typically terminate data flow of one leg first, and then forward in-sequence packets to the other leg. The isolation of packet loss in one leg from the other is an important factor in improving an overall end-to-end delivery performance because the recovery in one leg is usually quicker than otherwise in one longer connection. Multiplexed connections have multiple streams in such a connection. Layer 4 switches, without knowing the streams are multiplexed, do the same switching functions; they forward only in-sequence packets to the other leg. While it is believed that one single multiplexed connection generally shows improved performance over non-multiplexed multiple connections, one reported drawback of such multiplexed connections is a higher sensitivity to packet loss. This is a form head of line blocking (HOL) at the connection level, where the data unit in problem blocks all other data units behind.

BRIEF SUMMARY

This disclosure provides for a method to relieve such head of line blocking problems for Layer 4 switches. To this end, when out-of-sequence packets are detected, the switch still continues to relay those packets as long as they are in different streams and they are in-sequence in their respective stream.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
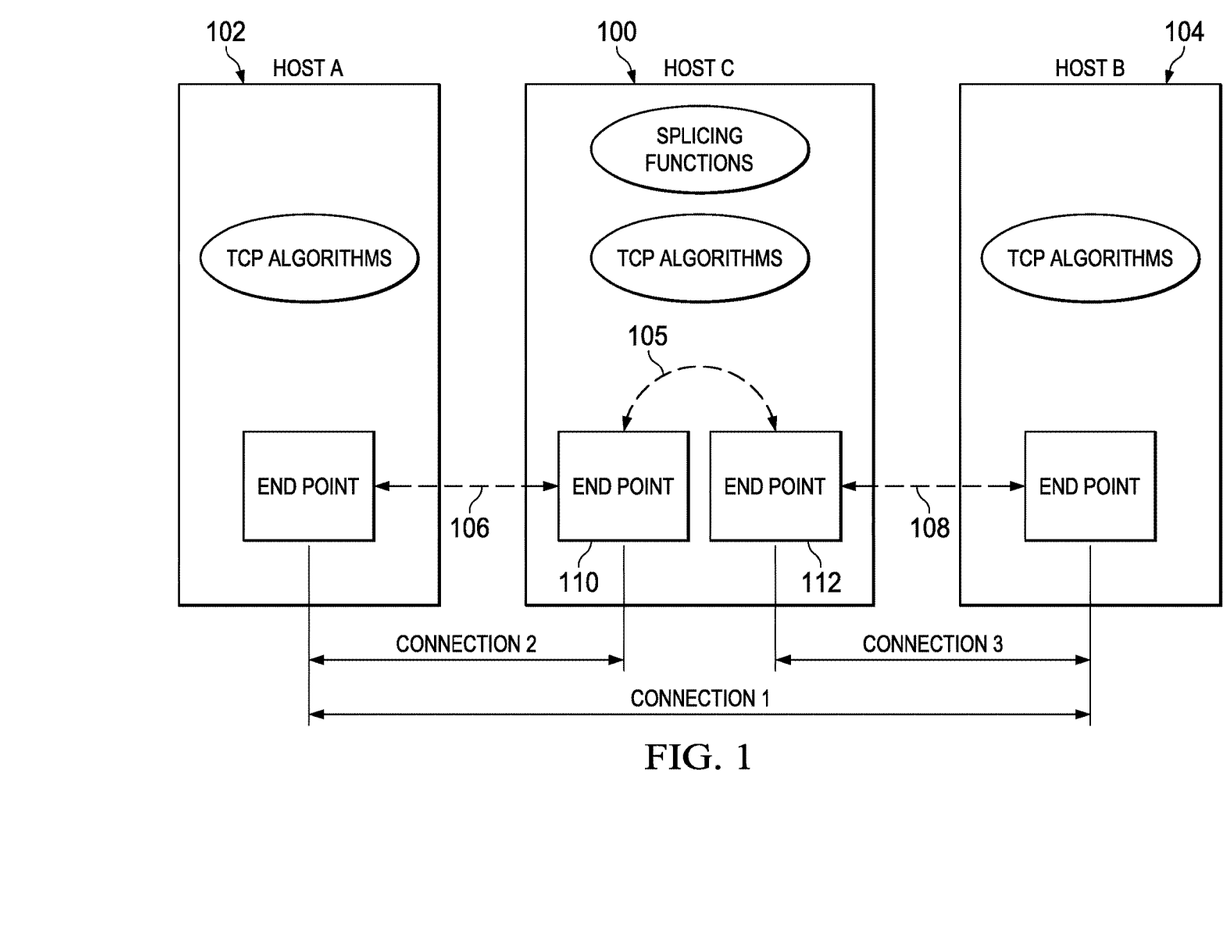
FIG. 1 is a block diagram of a known transport layer switch.

FIG. 1 depicts a model of the common implementation of a transport layer switch operating environment. In this drawing, Host C 100 is the switch between Host A 102 and B 104. More specifically, a splicing function in Host C is the switch between the two connections, one connection 106 between Host A and C, and another connection 108 between Host C and B. The splicing functionality 105 acts with respect to TCP end point 110 and 112 at Host C to seamlessly connect (splice) $TCP_{(a,c)}$ and $TCP_{(c,b)}$. The splicing functionality 105 transfers packets from one end point to another in the same host. Each packet flow, sometimes referred to as a connection segment, is terminated before being transferred to some other flow (connection). Host C is not necessarily just a single computing machine; indeed, the basic switching notion shown in FIG. 1 may be generalized as a distributed environment wherein an application layer overlay (comprising a large number of separate machines) on top of the Internet handles a massive number of TCP pairs.

Regarding the common question on the motivation of having a switch between two connections, research has found that an intermediate node as a relay between the two connection segments, as illustrated as Host C in FIG. 1, actually can help achieve higher end-to-end performance. Although it might appear counter-intuitive with an additional host in between, the results are based on the high recovery cost of packet loss inherent to the reliable data transfer algorithms of TCP. In particular, the recovery cost on either one of segments (Connection 106 and Connection 108) is found lower than that on the end-to-end connection.

Note that the splicing functionality 105 (FIG. 1) transfers packets from one end point to another in the same host. Each packet flow, a connection segment, is terminated before being transferred to the other flow (connection).

One crucial point of layer 4 switching is that it transfers only in-sequence packets of one flow to the other. In this way, the packet loss event of one leg is isolated from the other leg. When a loss occurs, the packets behind the lost one are waiting at the Layer 4 switch until the lost packet is recovered.

Figure 2:
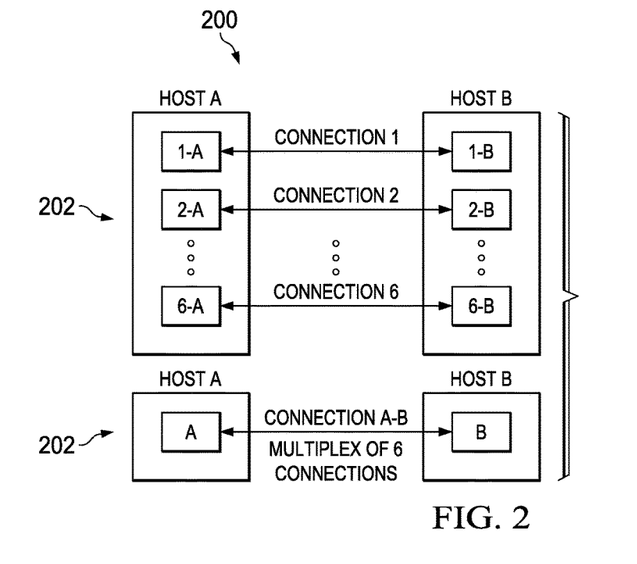
FIG. 2 depicts uniplexed versus multiplexed connections.

FIG. 2 depicts an example of connection multiplexing. The upper portion 200 shows a uniplex situation where six (6) connections are established between Host A and B. The lower portion 202 shows the multiplexing example, where all the 6 connections are now multiplexed into one single connection between Host A and B. Note that the TCP connection itself is not aware of the fact if it is multiplexed or uniplexed. Rather, the notion of multiplexing applies only to the application of the underlying TCP connection. Likewise, the end point buffer management (see, FIG. 1) is not aware of multiplexing. Each end point buffer is associated with one unique application (user) of the TCP connection. So, the TCP packets in the buffer are delivered to only one application (user). Because TCP itself does not know the required buffer size, it is up to the application to set up the size initially before actual data transmission starts. Typically, there is a one-to-one unique association between a TCP connection and a given process or thread.

Figure 3:
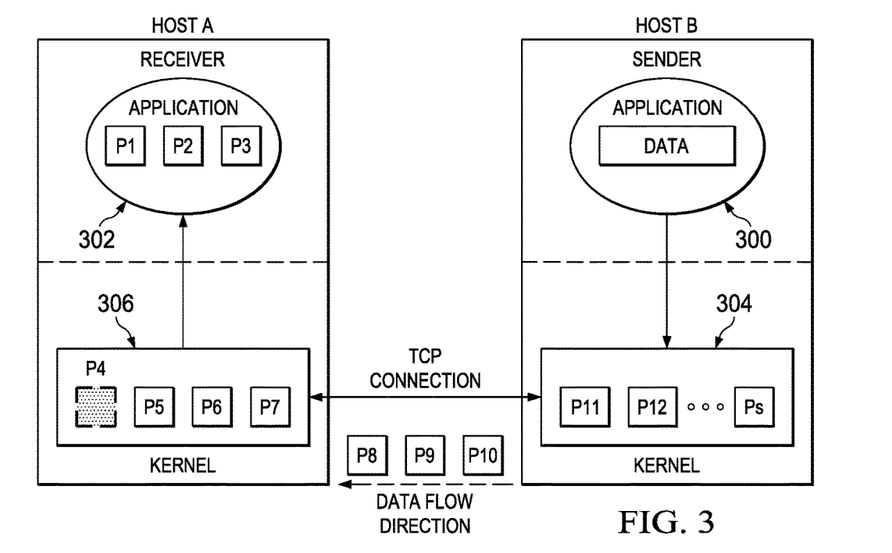
FIG. 3 illustrates a loss recovery model for the TCP protocol.

FIG. 3 shows a simple model of TCP packet loss recovery. Here, assume that the application 300 at Host B is sending some data to the application 302 at Host A. To that end, the data at Host B first is sent down to the TCP sender 304 in the same host. In the TCP sender 304, the data is segmented to the size of TCP packet. Each packet is given a sequence number in the connection. By monitoring the sequence number of receiving packets, Host A can know which packets arrived in sequence and which packets are likely lost. In this example scenario, the packet $P_4$ is lost on its way. Host A recognizes that $P_4$ is missing. So, Host A delivers only those packets in sequence ($P_1$ $P_2$ and $P_3$) to the application. As also depicted, however, those packets (namely, $P_5$ $P_6$ and $P_7$) already received by the TCP receiver 306 at Host A right after the lost (or out-of-sequence) packet are blocked from being delivered to the application. Further, the in-flight packets ($P_8$ $P_9$ and $P_{10}$) are likely to be blocked from delivery until the seemingly lost one, $P_4$, is recovered. From the receiver's perspective, the recovery requires at least one round trip time of delay, from the sending of lost indication to the sender, to the reception of retransmitted packet from the sender. Eventually, the loss will be recovered by the cooperation of Host A and B. Details of recovery process, not shown in this figure, are referred to in the relevant TCP standard.

By way of additional background, it is well-known that a large portion of Internet traffic is from web applications. Most web applications are based on HTTP (Hypertext Transfer protocol), which in turn runs on top of TCP. So, technically the combination of HTTP and TCP has quickly become the dominant data transfer vehicle over the Internet. Although the vehicle has been one of key technical components of the huge success of the Internet, HTTP has been recognized as a bottleneck. To address HTTP inefficiencies, the industry has proposed a new transfer protocol, namely, SPDY. With the fast adoption of SPDY by a group of leading Internet companies, IETF is now in the process of standardizing the next generation of HTTP mostly based on the experimental and field experiences of SPDY. The most recent version of draft, toward HTTP 2.0, is publicly available.

One of the critical features of HTTP 2.0 in comparison with the predecessor, HTTP 1.1, is to use one TCP connection per domain by multiplexing otherwise multiple data flows from multiple TCP connections. In the IETF draft, the data flows multiplexed into one single TCP connection are called streams. With respect to the multiplexing aspect, FIG. 2 of course suggests the implicit multiplexing and de-multiplexing aspect of HTTP 2.0. De-multiplexing requires a piece of information with which the receiver can tell the stream to which the receiving packet belongs. In HTTP 2.0, the newly introduced framing layer, sitting between application and Layer 4, performs the necessary role of providing the critical information as to the stream of which the packet is part. With the historic semantics of HTTP, which are well preserved in HTTP 2.0, because each web object is eligible for the creation of a stream (a pair of object request and response), there can be a rather large number of streams for most popular web sites. In particular, at the sender, web objects are firstly encoded to frames, then encoded again to TCP packets. Likewise, at the receiver, TCP packets are assembled to form frames, then assembled again to form objects. HTTP 2.0-based applications therefore will have a little more overhead for multiplexing at the sender side, and de-multiplexing at the receiver side. In the IETF HTTP 2.0 draft, the size of frame is encoded by 24 bits. So, the maximum size of a frame can be as large as 16 MB. The initial size is set by default to 16 KB, which is much larger than the size of one TCP packet, approximately 1.5 KB.

Figure 4:
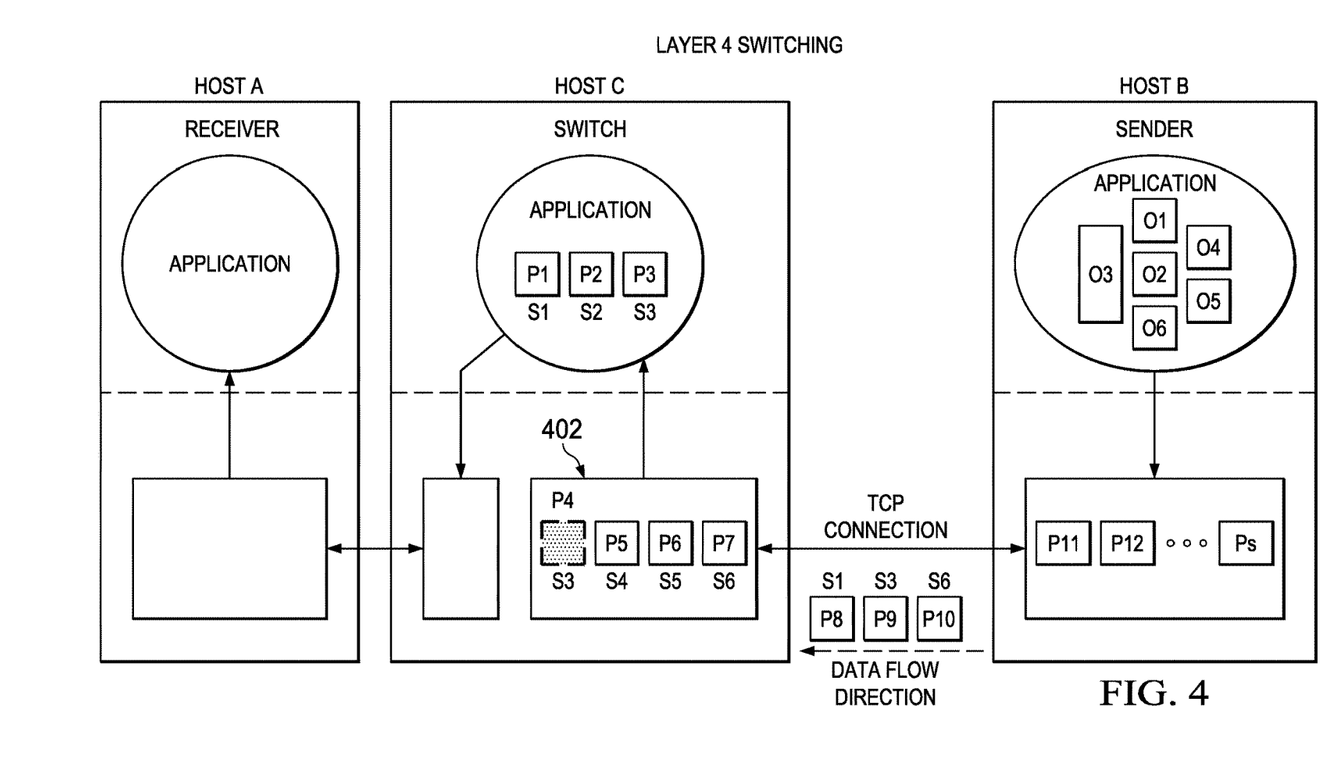
FIG. 4 illustrates TCP loss recover at a Layer 4 switch with the HTTP 2.0 protocol.

FIG. 4 shows an implementation of TCP loss recovery with HTTP 2.0. Here, the web objects are labeled from $O_1$ to. $O_6$. In HTTP 2.0, 6 streams are created to deliver these 6 web objects. So, the streams $S_1$ to $S_6$ correspond to $O_1$ to $O_6$ respectively. In a current snapshot, such as depicted in FIG. 4, the TCP receiver 402 at Host C has received 6 packets, $P_1$ to $P_7$ but $P_4$ once again is lost. Both $P_3$ and $P_4$ belong to $S_3$. As also shown, there are presumed to be 3 in-flight packets, ($P_8$ $P_9$ and $P_{10}$). They belong to $S_1$, $S_3$ and $S_6$ respectively. In terms of the recovery functionality, the loss is recovered in the same manner as before and as illustrated in FIG. 3. That said, a problem emerges in the recovery with HTTP 2.0, however. This can be seen by viewing the example.

In particular, application 404 at Host A has received 3 TCP packets. In the TCP receiver 402 at Host A, however, $P_4$ is lost (or not received yet). In the straightforward design, all the packets received already by Host C ($P_5$ $P_6$ and $P_7$) are blocked from delivery as they are supposed to be delivered only in-sequence. The in-flight packets will be in the same situation, waiting for a recovery of $P_4$. Now, a closer look reveals that the blocked packets in the TCP receiver at Host C belong to Stream 4, 5 and 6 respectively. The problem is that, semantically, those packets belonging to Stream 4, 5 and 6 do not have to be blocked because they belong to different web objects from the lost one, object 3, in this case. This problem still applies to those still are in flight ($P_8$ and $P_{10}$). $P_9$, the only packet in flight, is qualified to be blocked because it belongs to the same stream together with the lost one, $P_4$. This inefficiency of recovery happens as long as the TCP receiver is not aware of the fact that the connection has multiplexed streams in it, where each stream was created for different web object at Host B.

This problem, in theory, is not unique to HTTP 2.0. Rather, it is another example of head of line blocking (HOL) problem, where a lost data unit blocks all other units behind it from being processed due to the in-order serialization requirement.

In HTTP 2.0 over TCP, the property of in-sequence delivery guarantee by TCP in effect imposes the in-order serialization requirement. The serialization in turn creates the inefficiency problem exemplified above.

Object Reordering

With the above as background, the technique of this disclosure is now described. In this approach, the HOL problem is solved by letting TCP be aware of the fact that it delivers multiplexed streams.

Figure 5:
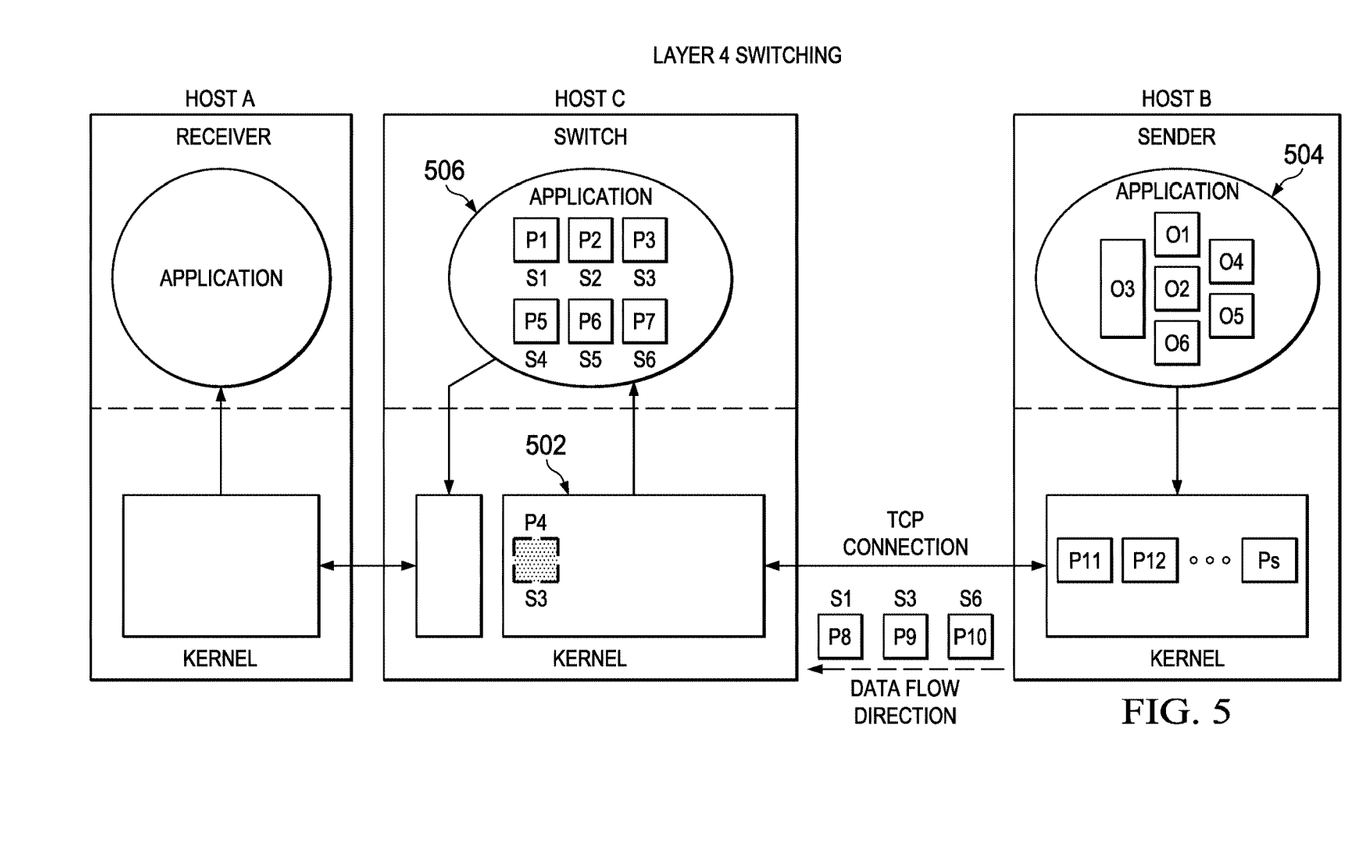
FIG. 5 depicts a model of object reordering at the Layer 4 switch according to this disclosure.

FIG. 5 depicts the approach in the context of a Layer 4 switch 500 positioned between Host A and Host B. For ease of comparison, FIG. 5 has the same traffic situation as in FIG. 4, although this is not intended to be limiting, When the TCP receiver 502 at Host C detects the loss of $P_4$, it still continues to look into the other packets that have already arrived ($P_5$ $P_6$ and $P_7$). The TCP receiver 502 now discovers that the out-of-order packets behind the lost one are in fact from different streams from the one to which the lost packet belongs. In particular, the lost packet, $P_4$ in this example, is part of the third stream, $S_3$, which is originated from the third object, $O_3$, at the application 504 on Host B. Knowing the relationships between streams and packets, the TCP receiver 502 at Host C still delivers the packets ($P_5$ $P_6$ and $P_7$) to the application 506 on Host C.

Importantly, the lost packet $P_4$ in this new model does not block the packets behind it from being delivered. This performance improvement is possible because of the awareness of multiplexed streams by TCP. This approach solves HOL problem introduced as a side effect of multiplexing by SPDY/HTTP 2.0.

Depending on the nature of application, Host C has two options for Layer 4 switching. In one option, Host C can keep forwarding any packets as long as they are in sequence in the respective streams. In another option, Host C can forward objects upon its completion at Host C. In either case, the forwarding (Layer 4 switching) is no longer blocked by the lost packet, $P_4$.

To implement this approach, TCP is required to recognize the stream to which each packet belongs. This following describes how this can be accomplished. From the perspective of layered network protocol architecture, typically a Layer 4 protocol does not have knowledge about the higher layers. To override this default behavior, the approach herein preferably makes use of an optional field of a TCP header to include information that TCP can use to recognize the stream.

Figure 6:
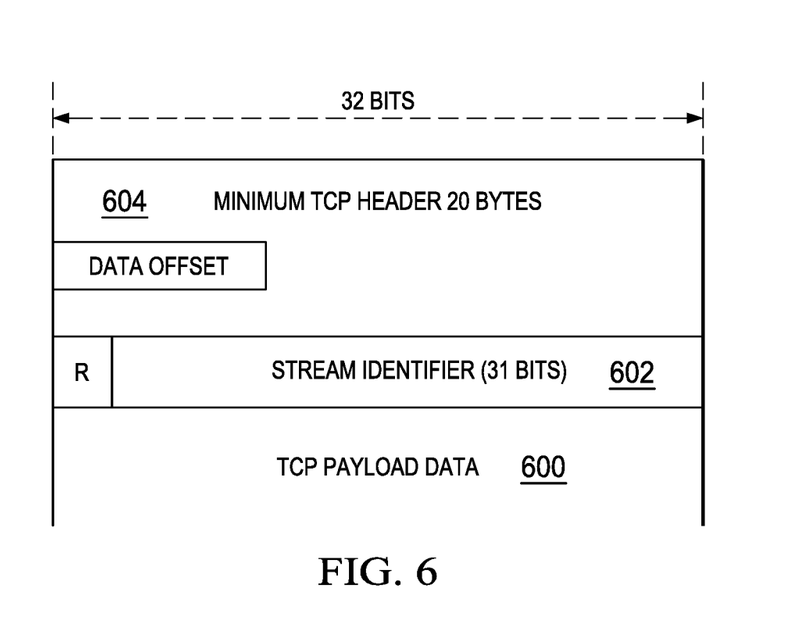
FIG. 6 depicts a TCP header with an optional first field according to this disclosure.

FIG. 6 shows how the stream information can be encoded into the TCP header 600. The stream identifier 602 in the current draft for standardization is 31 bits long. In terms of processing, it is effectively 32 bits long. From the 32-bit data, the first bit is reserved for future use. In one embodiment, the entire 32 bit-long data string is copied into the first 4 bytes of TCP optional field. This inclusion of stream ID will make the TCP header 24 bytes, 4 bytes larger than the minimum. In accordance with this inclusion, the data offset field 604 needs to indicate the new starting point of the TCP payload. If this is the only optional metadata, the beginning of the payload will be $24_{th}$ byte as the first byte is denoted as $0_{th}$. Where stream ID inclusion is used, more stream metadata can be added in the future if needed. The maximum size of the TCP optional field is 40 bytes or 320 bits. The inclusion of stream ID therefore uses only 10% of the maximum optional field size.

The approach depicted in FIG. 6 may be used in the context of HTTP 2.0 because in general the receiver cannot tell what type of data resides in the TCP header optional field. So, the applicability of this format is limited to the situation where both sender and receiver operate in the context of HTTP 2.0-based object requests and responses.

Figure 7:
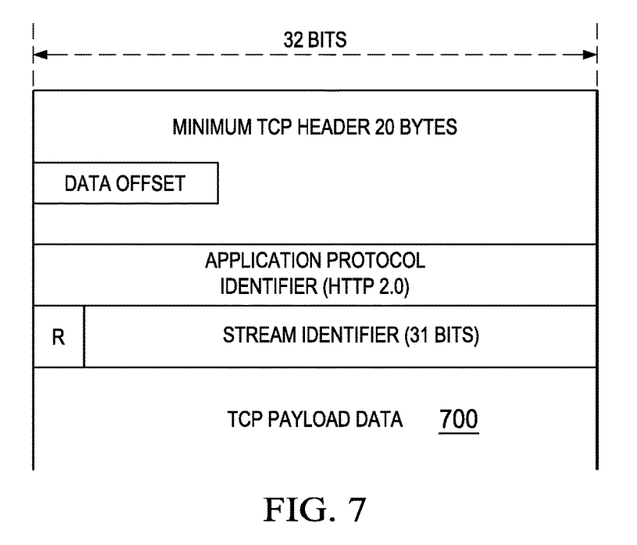
FIG. 7 depicts a TCP header with an optional second field according to this disclosure.

To make this approach more general, the TCP header format may be as provided in FIG. 7. In this format, the first 4 bytes of the optional field indicate the application layer protocol, based on which the receiver can interpret the following 4 bytes. This approach incurs slightly more overhead due to the new task of application layer protocol identification, which is not part of standard TCP.

The introduction of a framing layer by SPDY/HTTP 2.0, which creates the streams, which are in turn multiplexed into TCP data flows, requires some form of implementation. In theory, an implementation can be either in the kernel or in application. This approach, namely, using the TCP header optional field, typically lends itself to kernel implementation, although this is not a requirement.

This functionality of object reordering is especially advantageous in the context of Layer 4 switching. In particular, the Layer 4 switch is programmed to determine if object reordering would make the overall data transfer faster. Generally, this will be the case as long as one object is (partially) ready, i.e., all packets are in-sequence, and the switch is not waiting on some other object or packet, which is independent of the objects ready to transfer.

In addition, the TCP header formatting and interpretation (as described above) does not have to be invoked on every incoming packet. An implementation can invoke this additional task upon the detection of packet loss or the likelihood of packet loss. The new overhead of optional field interpretation should be well below of the cost of waiting for the loss recovery, which requires at least the time amount for a round trip.

Object reordering at the Layer 4 switch as described herein is independent of the underlying loss recovery algorithms, which typically operate within the context of single TCP leg. That said, the selective acknowledgement-based approach (so-called SACK) may help improve the overall performance of this technique. In particular, in cumulative acknowledgement-based approaches (such as shown in FIG. 4 and FIG. 5), the six packets ($P_5 \ldots P_{10}$) are retransmitted together with the lost one, $P_4$, by the sender. In contrast, in SACK, only $P_4$ will be retransmitted, which saves the receiver at Host C the time to receive and process.

The technique has several advantages, namely, lower latency and higher throughput, as well as higher utilization of the switch. Using the described approach, the overall end-to-end latency is lower because it eliminates or reduces the HOL problem in the middle at the Layer 4 switch. Lower latency increases throughput. Further, the total time in which the Layer 4 switch is actively involved for the same amount of data switching is shorter due to the elimination or reduction of the HOL problem.

Figure 8:
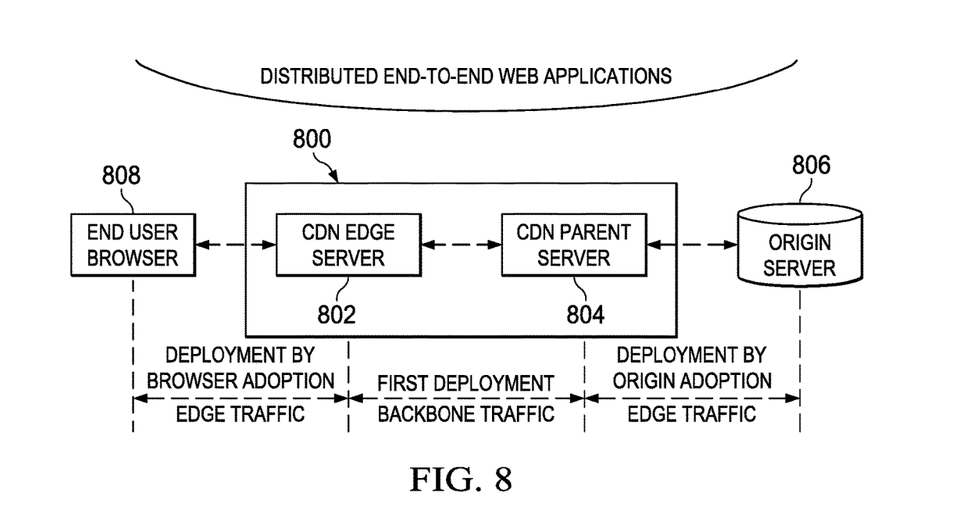
FIG. 8 depicts how object reordering as described herein may be implemented in the context of a content delivery network (CDN).

The approach herein may be implemented in the context of a content delivery network (CDN). As depicted in FIG. 8, and as well-known, a typical CDN 800 may comprise edge servers 802, and parent CDN servers 804. Content provider (s) publish their content at origin servers, such as origin server 806. End users 808 that request that content are directed (via DNS) to the CDN edge servers. In this delivery context, many Internet companies are quickly adopting SPDY/HTTP 2.0 protocols in an effort to optimize their web traffic. Many other content providers are likely to transition to SPDY/HTTP 2.0 in the near future. The technique herein improves the overall delivery time by reducing the HOL problem introduced by the multiplexing nature of SPDY/HTTP 2.0. In a deployment scenario, such as shown in FIG. 8, only the Layer 4 switches, i.e., CDN edge and parent servers 802 and 804, adopt the strategy of this disclosure. In this scenario, the traffic on the CDN backbone 810 is treated efficiently (in the event of packet loss), and preferably the TCP header optional field is written and read only by the CDN servers. If content providers adopt the approach, the traffic between the origin and CDN parent servers is more efficiently processed in the event of packet loss. Lastly, if browsers adopt this technique, end user upload traffic (e.g., from the end user equipment toward the origin server) is more stable despite the more frequent event of packet loss in the last mile networks.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an operating system and/or application layer solution, although this is not a limitation.

There is no limitation on the type of computing entity that may implement the connection control functionality of this disclosure. Any computing entity (system, machine, device, program, process, utility, or the like) may provide this operation.

As noted above, the techniques herein may be implemented to facilitate content delivery over a mobile network.

What is claimed is as follows:

1. A method of packet switching multiplexed packet streams carried out in a Layer 4 switch positioned between a first host and a second host, comprising:
   maintaining information that associates individual packets with individual ones of the multiplexed packet streams;
   as packets are being delivered via the Layer 4 switch, and upon determining a packet loss event, identifying which stream of the multiplexed packet streams is impacted by the packet loss event; and
   continuing delivery of packets from streams other than the stream impacted by the packet loss event even if those packets are out-of-order with respect to the packet that is the subject of the packet loss event.

2. The method as described in claim 1 further including initiating a packet loss recovery operation with respect to the stream impacted by the packet loss event.

3. The method as described in claim 1 wherein the information that associates individual packets with individual ones of the multiplexed packet streams is identified in a packet header.

4. The method as described in claim 3 wherein the packet header is a TCP packet header.

5. The method as described in claim 4 wherein the TCP packet header includes an optional field that includes data identifying an individual one of the multiplexed packet streams.

6. A Layer 4 switch apparatus positioned between a first host and a second host, comprising:
   a processor;
   computer memory holding computer program instructions executed by the processor, the computer program instructions comprising program code configured to:
      maintain information that associates individual packets with individual ones of the multiplexed packet streams;
      as packets are being delivered through the Layer 4 switch, and upon determining a packet loss event, identifying which stream of the multiplexed packet streams is impacted by the packet loss event; and
      continue delivery of packets from streams other than the stream impacted by the packet loss event even if those packets are out-of-order with respect to the packet that is the subject of the packet loss event.

7. The apparatus as described in claim 6 wherein the program code is further configured to initiate a packet loss recovery operation with respect to the stream impacted by the packet loss event.

8. The apparatus as described in claim 6 wherein the information that associates individual packets with individual ones of the multiplexed packet streams is identified in a packet header.

9. The apparatus as described in claim 8 wherein the packet header is a TCP packet header.

10. The apparatus as described in claim 9 wherein the TCP packet header includes an optional field that includes data identifying an individual one of the multiplexed packet streams.

11. A computer program product in a non-transitory computer readable medium for use in a data processing system configured as a Layer 4 switch and positioned between a first host and a second host, the computer program product holding computer program instructions executed by the data processing system, the computer program instructions comprising program code configured to:
   maintain information that associates individual packets with individual ones of the multiplexed packet streams;
   as packets are being delivered through the Layer 4 switch, and upon determining a packet loss event, identifying which stream of the multiplexed packet streams is impacted by the packet loss event; and
   continue delivery of packets from streams other than the stream impacted by the packet loss event even if those packets are out-of-order with respect to the packet that is the subject of the packet loss event.

12. The computer program product as described in claim 11 wherein the program code is further configured to initiate a packet loss recovery operation with respect to the stream impacted by the packet loss event.

13. The computer program product as described in claim 11 wherein the information that associates individual packets with individual ones of the multiplexed packet streams is identified in a packet header.

14. The computer program product as described in claim 13 wherein the packet header is a TCP packet header.

15. The computer program product as described in claim 14 wherein the TCP packet header includes an optional field that includes data identifying an individual one of the multiplexed packet streams.

16. The method as described in claim 1 wherein the Layer 4 switch is associated with a content delivery network (CDN).

17. The apparatus as described in claim 6 wherein the Layer 4 switch is associated with a content delivery network (CDN).

18. The computer program product as described in claim 11 wherein the Layer 4 switch is associated with a content delivery network (CDN).

\* \* \* \* \*